(12) United States Patent
Sehmby et al.

(10) Patent No.: US 11,637,484 B2
(45) Date of Patent: Apr. 25, 2023

(54) COVER RETENTION

(71) Applicant: Hanon Systems EFP Canada Ltd., Concord (CA)

(72) Inventors: Manmohan Sehmby, Brampton (CA); Harpreet Baraich, Brampton (CA)

(73) Assignee: HANON SYSTEMS, Daejeon (KR)

( * ) Notice: Subject to any disclaimer, the term of this patent is extended or adjusted under 35 U.S.C. 154(b) by 367 days.

(21) Appl. No.: 17/135,583

(22) Filed: Dec. 28, 2020

(65) Prior Publication Data

US 2022/0205450 A1 Jun. 30, 2022

(51) Int. Cl.
*H02K 11/33* (2016.01)
*F04D 13/06* (2006.01)

(52) U.S. Cl.
CPC .......... *H02K 11/33* (2016.01); *F04D 13/0686* (2013.01)

(58) Field of Classification Search
CPC .... H02K 11/33; H02K 2211/03; H02K 5/225; H02K 5/22; H02K 11/30; H02K 7/083; H02K 5/24; H02K 5/1732; H02K 7/14; H02K 3/46; H02K 3/522; F04D 13/0686
USPC .................................................. 310/89, 68 R
See application file for complete search history.

(56) References Cited

U.S. PATENT DOCUMENTS

| | | | |
|---|---|---|---|
| 8,985,265 B2 * | 3/2015 | Hagiwara | ............ B62D 5/0406 180/443 |
| 9,188,128 B2 | 11/2015 | Lee et al. | |
| 9,810,223 B2 | 11/2017 | Irie et al. | |
| 10,128,720 B2 | 11/2018 | Ishizeki et al. | |
| 10,197,061 B2 | 2/2019 | Lee et al. | |
| 10,315,686 B2 * | 6/2019 | Wada | ..................... H02K 11/33 |
| 10,385,855 B2 | 8/2019 | Irie et al. | |
| 2016/0065030 A1 * | 3/2016 | Fujimoto | ............... B62D 5/046 310/68 D |
| 2016/0245283 A1 | 8/2016 | Chikaoka | |
| 2016/0248292 A1 | 8/2016 | Takarai | |
| 2016/0290364 A1 | 10/2016 | Lee | |
| 2017/0276136 A1 | 9/2017 | Kinoshita et al. | |
| 2018/0274540 A1 | 9/2018 | Kataoka et al. | |
| 2019/0376511 A1 | 12/2019 | Kobayashi et al. | |

(Continued)

FOREIGN PATENT DOCUMENTS

| | | |
|---|---|---|
| JP | 2004183595 A | 7/2004 |
| JP | 2008187755 A | 8/2008 |

(Continued)

*Primary Examiner* — Alexander A Singh
(74) *Attorney, Agent, or Firm* — Gregory Ozga; Warn Partners, P.C.

(57) ABSTRACT

A low profile electric pump arrangement having a motor housing connected to a pump element of a transmission for a vehicle. An inverter housing connected to the motor housing and has a where an electronics control unit (ECU) connects through the inverter housing to selectively supply power to the motor within the motor housing. The recess and the ECU are covered and sealed off from the elements by a plastic cover. In order to obtain a low profile of the electric pump arrangement so it can fit within a desired packaging line on a transmission casing a metal bracket is over molded into the plastic cover. The metal bracket has at least one exposed surface that engages the inverter housing to hold the plastic cover onto the inverter housing in a position so that the plastic cover covers and seals the ECU and recess at the second side of the inverter housing.

26 Claims, 5 Drawing Sheets

(56) References Cited

U.S. PATENT DOCUMENTS

2020/0049249 A1  2/2020  Iwase et al.
2020/0106345 A1* 4/2020  Kobayashi ............. H02K 3/522

FOREIGN PATENT DOCUMENTS

| | | |
|---|---|---|
| JP | 2011094553 A | 5/2011 |
| JP | 2012241565 A | 12/2012 |
| JP | 2013122234 A | 6/2013 |
| JP | 2013199922 A | 10/2013 |
| JP | 20133217237 A | 10/2013 |
| JP | 2013234597 A | 11/2013 |
| JP | 2013247761 A | 12/2013 |
| JP | 2013249817 A | 12/2013 |
| JP | 2014009676 A | 1/2014 |
| JP | 2014101779 A | 6/2014 |
| JP | 2014181562 A | 9/2014 |
| JP | 2015031172 A | 2/2015 |
| JP | 2015055201 A | 3/2015 |
| JP | 2015135108 A | 7/2015 |
| JP | 2015136280 A | 7/2015 |
| JP | 2015175235 A | 10/2015 |
| KR | 20140087180 A | 7/2014 |
| KR | 20200028062 A | 3/2020 |
| WO | 2014003287 A1 | 1/2014 |

* cited by examiner

COVER RETENTION

FIELD OF THE INVENTION

The present invention relates to an over molded plastic cover used to provide a low profile electric pump arrangement for a transmission with limited profile space.

BACKGROUND OF THE INVENTION

Several current transmission designs implement the use of an electric oil pump that provides fluid pressure to a vehicle transmission. The electric oil pump has a pump element with an electric motor connected. Often there is an electronic control unit (ECU) connected to the motor for controlling the power supplied to the motor, which in turn controls the output of the pump. The electronic control unit is protected from the outside environment by placement of an ECU cover over the location of the ECU. Forming the ECU cover out of plastic provides a couple of advantages. A plastic cover allows for a connector to be molded into the plastic cover in a way that the connector will be sealed to prevent fluids from migrating through the cover. Forming the ECU cover out of some other type of material such as metal presents challenges with providing a sealed connector and does not provide as good of corrosion resistance. However, the electric oil pump is connected to the transmission and must be placed at a location where space can be limited. As a result, when a plastic cover is used it is not always possible to package an ECU cover using conventional retention methods (i.e. using screws and bolt limiters) due to extremely tight packaging requirements.

FIG. 1 depicts a cross-sectional side view of an electric pump arrangement 10 which is part of a vehicle transmission and is connected to a transmission casing 38. The electric pump arrangement 10 has an electronics control unit 12 that is covered by a one piece plastic cover 14. The one piece plastic cover 14 is connected to a motor housing 16 using two fasteners 18A, 18B that extend through respective apertures 20A, 20B formed through an extension 22A, 22B of the one piece plastic cover 14. The extension 22A, 22B is formed of the same plastic as the rest of the one piece plastic cover 14. Each extension 22A, 22B has a shoulder 24A, 24B with a thickness 26. The shoulder 24A, 24B extends down to one of the apertures 20A, 20B which have a thickness 30. Since each extension 22A, 22B is made of plastic the thickness 26 and thickness 30 has to be a certain size in order for each aperture 20A, 20B to accommodate a compression limiter 32A, 32B that will prevent over-torquing of the respective fastener 18A, 18B, which could crack the extension 22A, 22B or damage other portions of the electric pump arrangement 10.

The transmission that the electric pump arrangement 10 is connected with has a packaging profile line 34. The packaging profile line 34 as used herein is defined as a line drawn between clearance points on the transmission casing 38. The electric pump arrangement 10, including the one piece plastic cover 24 and each fastener 18A, 18B, must be located a certain distance under the packaging profile line 34. The "certain distance" can change depending on the transmission design, but for example the "certain distance" is typically at least 3 millimeters, which means that the electric pump arrangement 10 must be at a distance of at least 3 millimeters from the packaging profile line 34. If for example as shown in FIG. 1, the electric pump arrangement 10 comes within the certain distance or extends past outside of the packaging profile line 34, then that location is labelled as packaging violation arrows 36A, 36B, 36C. The thickness 26 and the thickness 30 are problematic because portions of the shoulder 24B and fastener 18B do not fit into a packaging profile line 34 and as shown in FIG. 1, as illustrated by the at least three packaging violation arrows 36A, 36B, 36C. While the packaging violation arrows 36A, 36B, 36C are shown at three distinct locations it is within the scope of this invention for a packaging violation to occur at another location.

There is a need to provide an electric pump arrangement that resolves all packaging violations and fits within the designated certain distance within the packaging profile. There is also a need in the prior art to provide an ECU cover that is made of plastic rather than being made completely of metal or some other material, since plastic resists corrosion and is non-conductive.

SUMMARY OF THE INVENTION

The present invention presents a solution to the problem encountered in the prior art by providing a low profile electric pump arrangement. The low profile pump arrangement includes a motor housing connected to a pump element of a transmission for a vehicle. An inverter housing has a first side connected to the motor housing and a second side having a recess defined by an edge wall. Within the recess is an electronics control unit (ECU) that connects through the inverter housing to selectively supply power to the motor within the motor housing.

The recess of the inverter housing and the ECU are covered and sealed off from the elements by a plastic cover. The plastic cover has a perimeter sized to cover the recess and seal against the edge wall. In order to obtain a low profile of the electric pump arrangement so it can fit within a desired packaging line on a transmission casing, a metal bracket is over molded into the plastic cover. The metal bracket has at least one exposed surface that engages the inverter housing to hold the plastic cover onto the inverter housing in a position so that the plastic cover covers and seals the ECU and recess at the second side of the inverter housing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings.

DETAILED DESCRIPTION OF THE PREFERRED EMBODIMENTS

The following description of the preferred embodiments is merely exemplary in nature and is in no way intended to limit the invention, its application, or uses.

Figure 1:
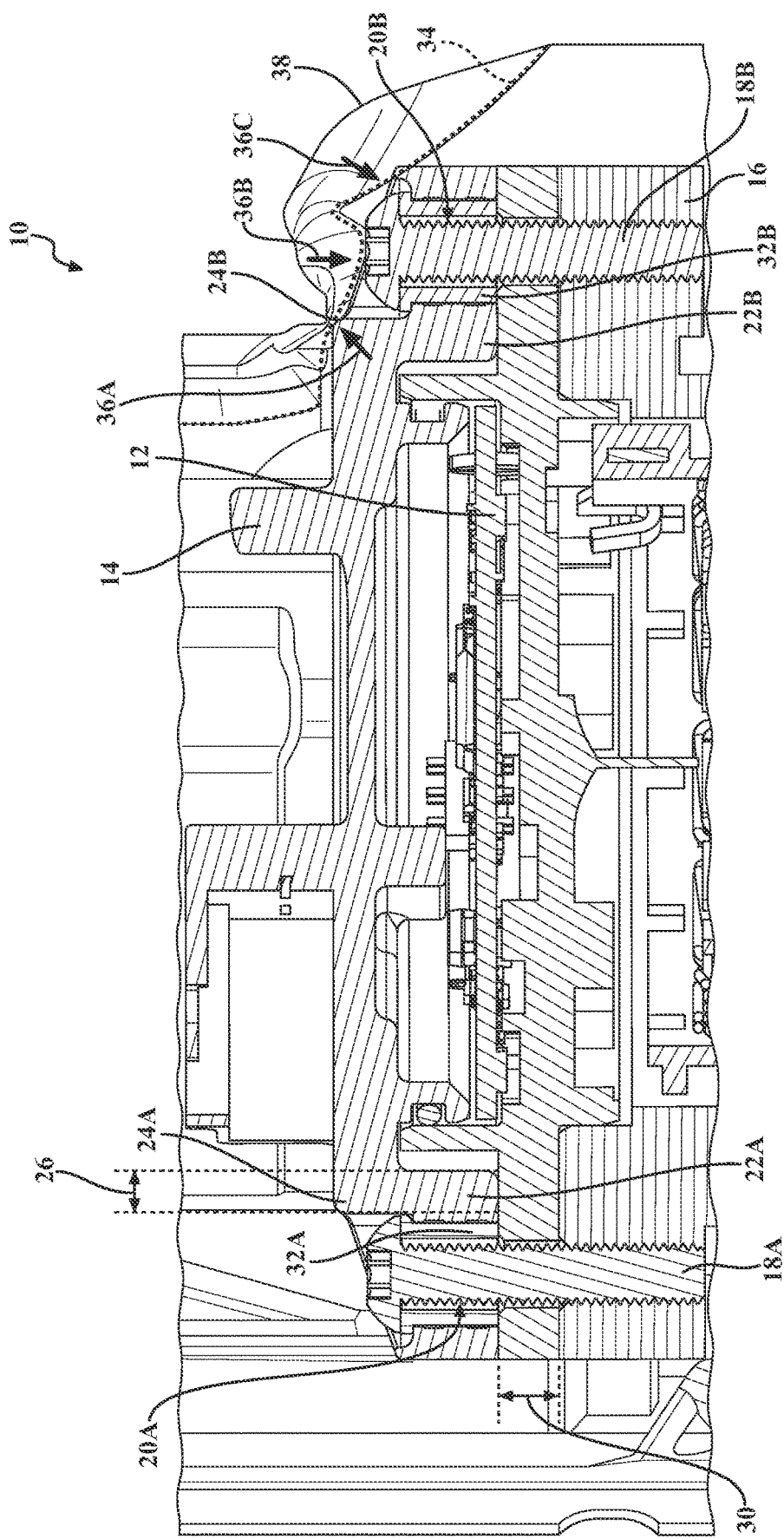
FIG. 1 is a cross sectional side plan view of an electric pump arrangement according to the prior art.
Figure 2:
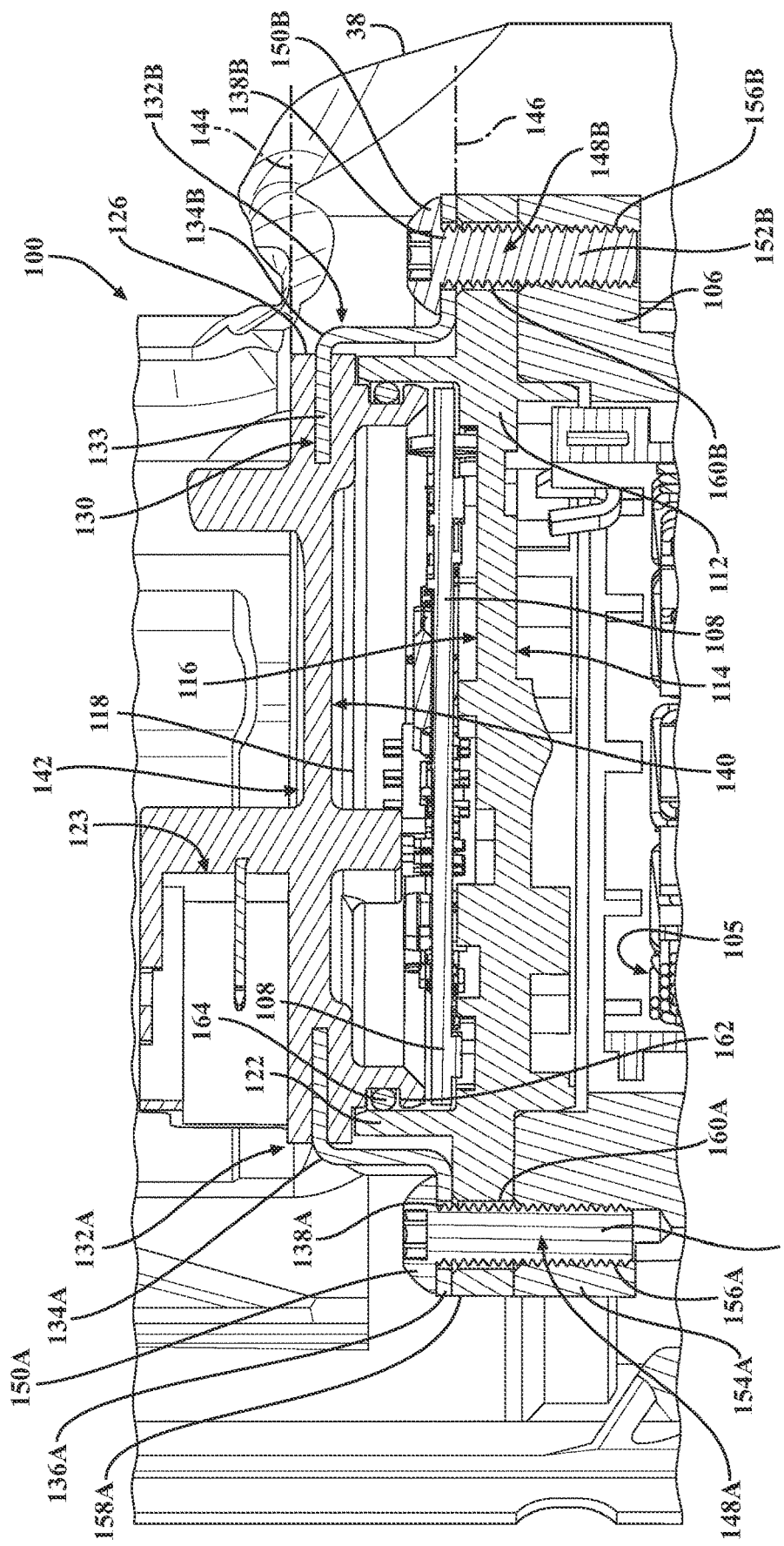
FIG. 2 is a cross sectional side plan view of a low profile electric pump arrangement according to a first embodiment of the present invention.
Figure 3:
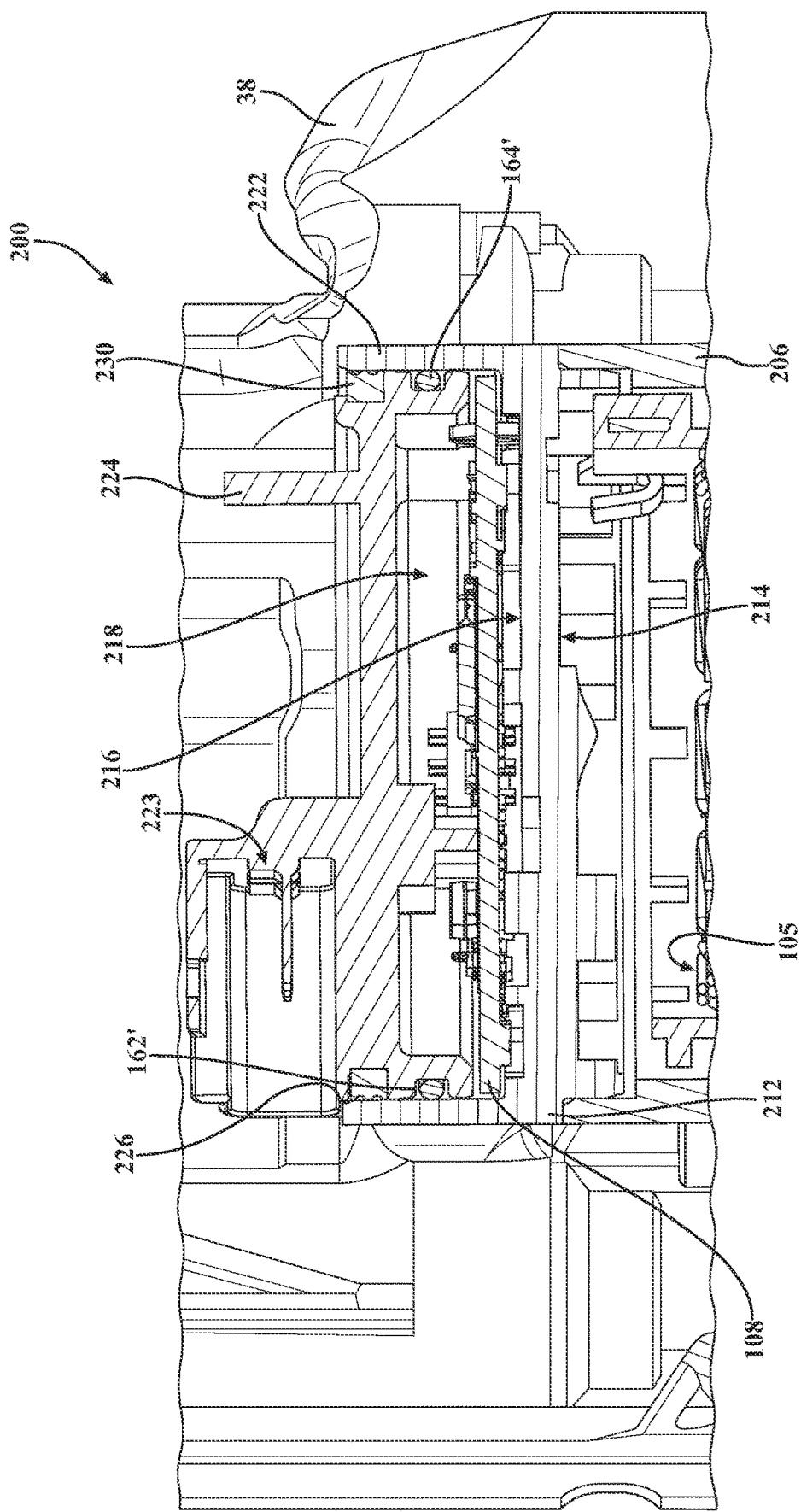
FIG. 3 is a cross sectional side plan view of a low profile electric pump arrangement according to a second embodiment of the present invention.
Figure 4:
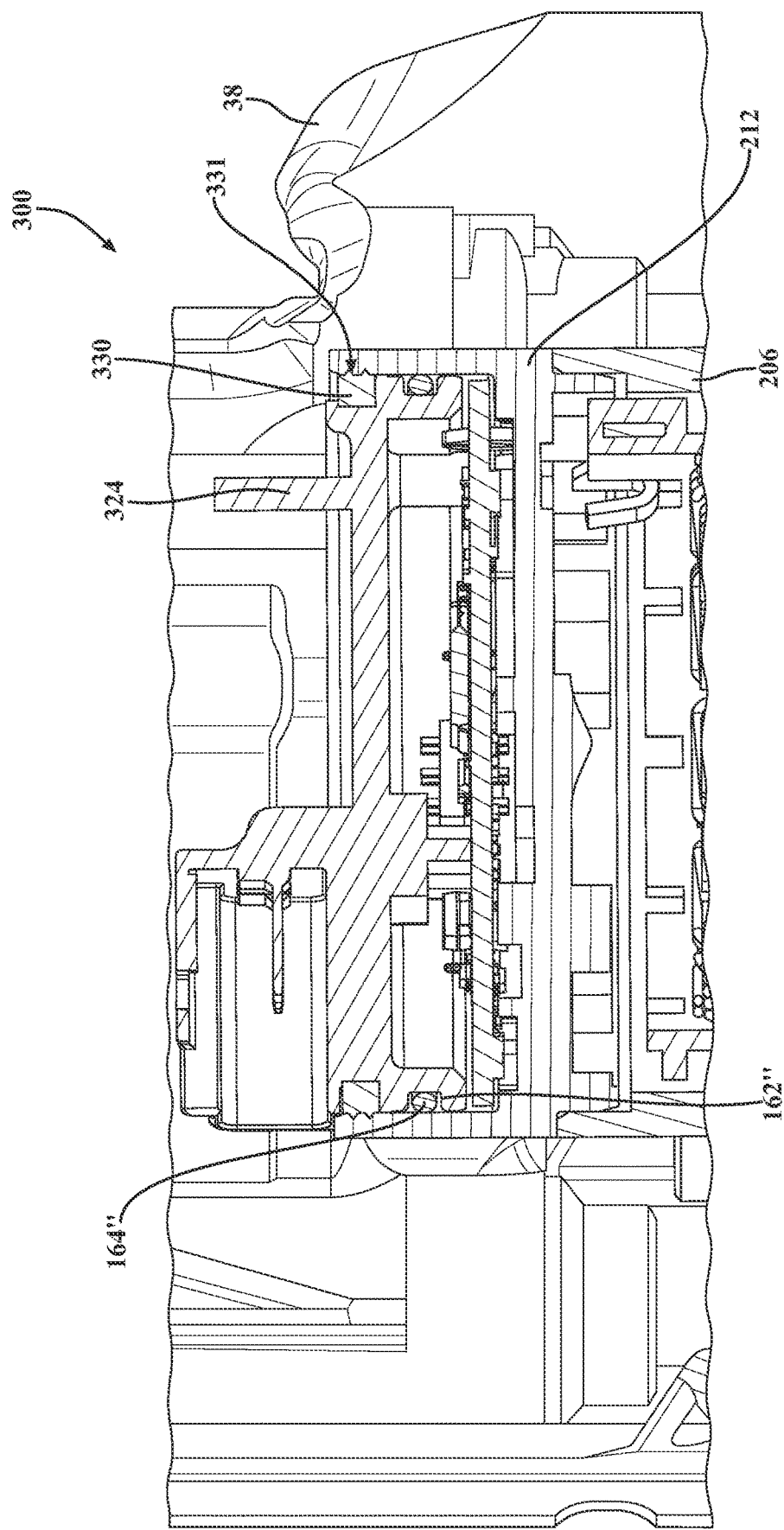
FIG. 4 is a cross sectional side plan view of a low profile electric pump arrangement according to a third embodiment of the present invention.

In the description below like reference numbers designate like or corresponding parts throughout the different embodiments. Additionally like reference numbers shown in FIG. 1 are used to demonstrate the same structures in FIGS. 2-4. FIGS. 2-4 depict a low profile electric pump 100, 200, 300 according to three different embodiments, which are used in place of the electric pump arrangement 10 shown in FIG. 1. As shown in FIGS. 2-4 the packaging profile line 34 and the transmission casing 38 are generally the same as the structures shown in FIG. 1. The packaging profile line 34 is defined by clearance points located on the transmission casing 38. In the embodiments shown in FIGS. 2-4 the motor housing, inverter housing and plastic cover are all located at a distance within the packaging profile line, without any packaging violations.

Figure 5:
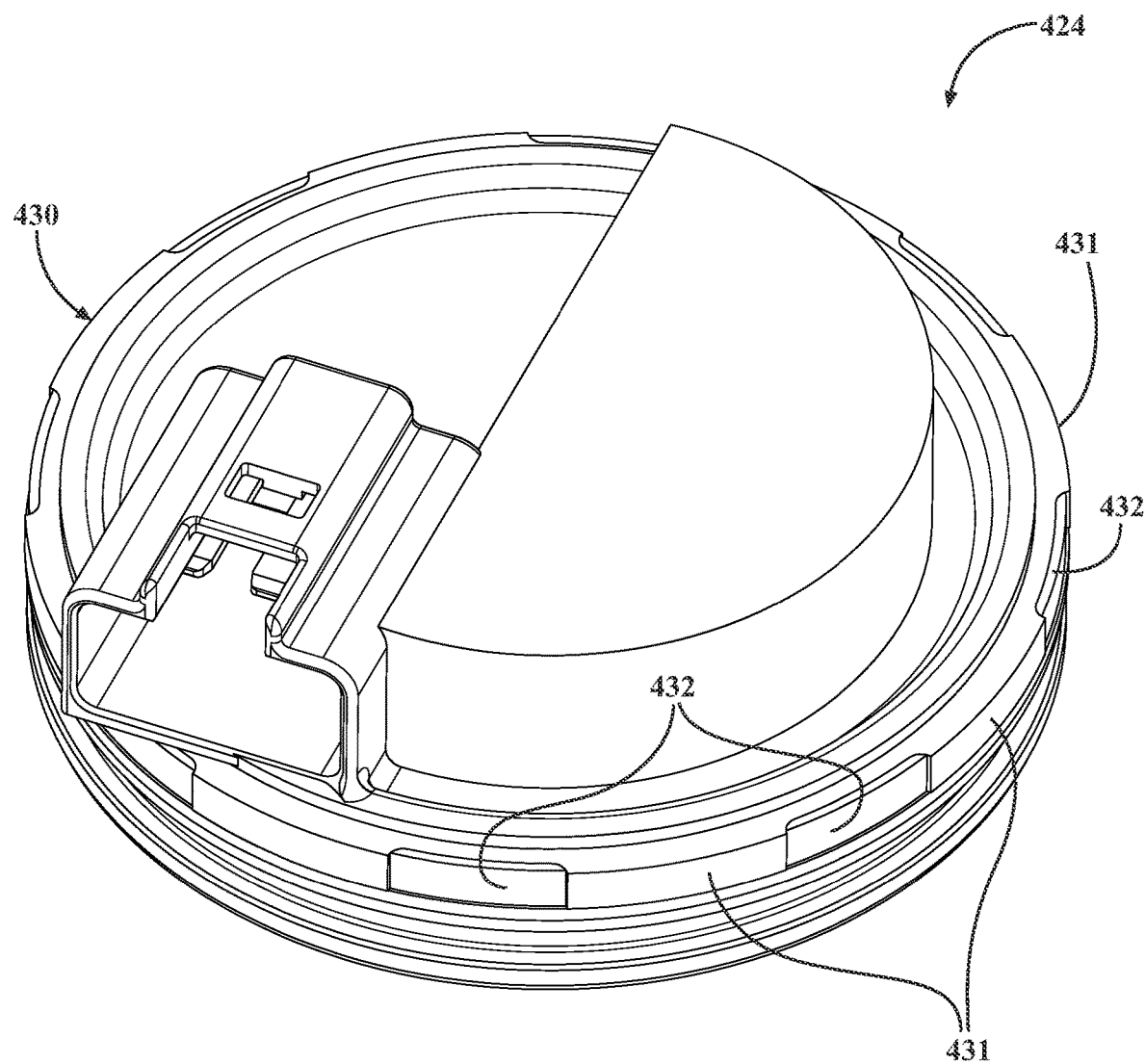
FIG. 5 is a bottom side perspective view of a plastic cap according to another embodiment of the invention.

Referring now to FIGS. 2-3 and 5 the present invention includes two different embodiments that pertain to a low profile electric pump arrangement 100, 200 that is used in locations where there is limited space available for connecting the electric pump (i.e., tight packing requirements). There are some common elements between the two embodiments, which will now be discussed together. The low profile electric pump arrangement 100, 200 can be used in any type of application, the embodiments shown depict the low profile electric pump arrangement 100, 200 being connected to the transmission casing 38 of a vehicle in place of the electric pump arrangement 10 shown in FIG. 1. In FIGS. 2-3 and 5 the same reference numbers from FIG. 1 will also be used to show the same structures. The transmission casing 38 has a pump portion 104, which contains a suitable pump element such as a gerotor, vane or any other suitable style of pump for pumping fluid within the transmission casing 38.

The pump element within the pump portion 104 is driven by a motor that is contained within a motor housing 106, 206 connected to the pump portion 104. The motor housing 106, 206 contains a stator and rotor 105, which when energized causes the pump element to rotate. The power supplied to the rotor and stator 105 is controlled by an electronics control unit 108 that is mounted to an inverter housing 112, 212 that is connected to the motor housing 106, 206 and serves as a heat sink. The inverter housing 112, 212 has a first side 114, 214 connected to the motor housing 106, 206 and a second side 116, 216 of the inverter housing 112, 212 having a recess 118, 218 and an opening defined by an edge wall 122, 222. The ECU 108 is connected to the inverter housing 112, 212 within the recess 118, 218. All the embodiments also include a plastic cover 124, 224 with a connector 123, 223 formed there through that is a sealed connection for supplying power to the ECU 108.

Referring to the low profile electric pump arrangement 100 shown in FIG. 2, the plastic cover 124 has a perimeter 126 sized to cover the recess 118 and seal against the edge wall 122 of the recess 118. The plastic cover 124 further includes a metal bracket 130 that is made of low carbon steel that has an over molded portion 133 of the metal bracket 130 that is over molded into the plastic cover 124. The metal bracket 130 has at least one exposed surface, which in the present embodiment of the invention is a pair of arms 132A, 132B that extend away from the plastic cover 124 and the over molded portion 133 of the metal bracket 130, past the perimeter 126 of the plastic cover 124. The plastic cover 124 has an inside surface 140 and an outside surface 142 that has a first plane 144. Each arm 132A, 132B has a shoulder 134A, 134B that extends away from the plastic cover 124 past the inside surface 140 and then bends away from the plastic cover 124 and forms a fastener tab 136A, 136B that has a second plane 146 that is parallel to the first plane 144. The entire metal bracket 130 including the shoulder 134A, 134B and fastener tab 136A, 136B has a thickness of about 1.5 mm or less.

Each fastener tab 136A, 136B includes an aperture 138A, 138B sized to receive a fastener 148A, 148B, each having a head 150A, 150B with a threaded shaft 152A, 152B with a diameter, extending from the head 150A, 150B. The aperture 138A, 138B is a clearance aperture that is larger in diameter than the threaded shaft 152A, 152B of the fastener 148A, 148B so that the threaded shaft 152A, 152B passes through the aperture 138A, 138B of the fastener tab 136A, 136B. The inverter housing 112 has a flange 158A, 158B with a clearance aperture 160A, 160B in the inverter housing 112 that is larger than the diameter of the threaded shaft 152 of the fastener, 148A, 148B, where the threaded shaft 152A, 152B passes through the respective clearance aperture 160A, 160B of the inverter housing 112. The motor housing 106 has a flange 154A, 154B with a threaded fastener aperture 156A, 156B formed therein. The threaded fastener aperture 156A, 156B is threaded and mates with the respective threaded shaft 152A, 152B of the fastener 148A, 148B forming a threaded connection. Upon connection of the fastener 148A, 148B with the threaded fastener aperture 156A, 156B, the head 150A, 150B of the fastener 148A, 148B contacts a portion of the fastener tab 136A, 136B around the circumference of the aperture 138A, 138B so that the head 150A, 150B presses against the fastener tab 136A, 136B, thereby holding the plastic cover 124 and inverter housing 112 against the motor housing 106 using the threaded connection. This connection holds the plastic cover 124 against the inverter housing 112 at a position so that the plastic cover 124 covers and seals the ECU 108 and recess 118 of the second side 116 of the inverter housing 112. While two arms 132A, 132B and their respective connection are described, it is within the scope of the invention for a greater or lesser number of arms on the metal bracket 130 to be used depending on the needs of a particular application.

In the present embodiment of the invention the use of the metal bracket 130 in combination with over molding it to the plastic cover 124, shows an improvement over the electric pump arrangement 10 in FIG. 1 because the low profile electric pump 100 is such that when assembled the motor housing 106, inverter housing 112, and plastic cover 124 are located at a distance within the packaging profile line 34 so there are no packaging violations as shown in FIG. 1.

FIG. 3 depicts the low profile electric pump arrangement 200 according to a second embodiment of the invention. In this embodiment the low profile electric pump arrangement 200 has a plastic cover 224 that does not use any fasteners for connection with the motor housing 206. This eliminates the inverter housing flange 158A, 158B and motor housing flange 154A, 154B shown in FIG. 2, which makes the profile of the electric pump arrangement 200 smaller than the profiles of both the electric pump arrangement 100 and electric pump arrangement 10. As a result, the low profile electric pump 200 is such that when assembled, the motor housing 206, inverter housing 212, and plastic cover 224 are located at a distance well within the packaging profile line 34 so there are no packaging violations as shown in FIG. 1.

The plastic cover 224 has a perimeter 226 sized to cover the recess 218 and seal against the edge wall 222 of the recess 218 of the inverter housing 216. The plastic cover 224 has a metal bracket 230 that is in the form of a circular ring made of aluminum. The advantage of using aluminum is that the inverter housing is also made of aluminum and forming both of aluminum means that there will be no relative thermal expansion in hot or cold operating conditions. However, the invention is not limited to the shape of the metal bracket 230 being a circular ring or being made of aluminum. It is possible for the metal bracket 230 to have virtually any type of shape that conforms to the perimeter 228 of the plastic cover 224 and made of any type of malleable material.

The metal bracket 230 is over molded to the plastic cover 224 such that there is an exposed surface 232 that extends past the perimeter 226 of the plastic cover 224. The metal bracket 230 is slightly larger than the inner diameter of the edge wall 222 of the recess 218. Since the metal bracket 230 is made of aluminum it is malleable so that upon connection of the plastic cover 224 to the inverter housing 212, the exposed surface 232 is shaped and forms a press-fit connection between the plastic cover 224 and the edge wall 222 of the recess 218 of the inverter housing 212.

FIG. 4 depicts another embodiment of a low profile pump arrangement 300, where a plastic cover 324 has a metal bracket 330 with one or more grooves 331 on an exposed surface 332 so that upon connection of the plastic cover 324 to the inverter housing 212, the one or more grooves 331 deform and provide the press-fit connection between the plastic cover 324 and the edge wall 222 of the recess 218 of the inverter housing 212.

FIG. 5 depicts another alternate embodiment of a plastic cover 424 that has a metal bracket 430. In this embodiment of the invention the metal bracket 430 includes a plurality of teeth 431 with a plurality of recesses 432 spaced between each pair of teeth, around the outer diameter circumference of the metal bracket 430. When the metal bracket 430 is over molded to the plastic cover 424 plastic material is formed in the plurality of recesses 432 to secure the metal bracket 430 to the plastic cover 424. This also secures the metal bracket 430 to the plastic cover 424 in a way that prevents the metal bracket 430 from rotating.

Referring to both FIGS. 2-4 the plastic cover 124, 224, 334 of each embodiment has a circumferential groove 162, 162', 162" with a respective sealing gasket 164, 164', 164" located therein. The circumferential groove 162, 162', 162" and sealing gasket 164, 164', 164" are respectively located under the metal bracket 130, 230, 330 and the rubber gasket 164, 164', 164" deforms and presses against the edge wall 122, 222 of the recess 118, 218 to provide a seal between the plastic cover 124, 224, 334 and the inverter housing 112, 212.

In the embodiments of the invention shown in FIGS. 3 and 4 the use of the metal bracket 230, 330 in combination with over molding it to the plastic cover 224, 324 shows an improvement over the electric pump arrangement 10 in FIG. 1 because the low profile electric pump arrangement 200, 300 is such that when assembled the motor housing 206, inverter housing 212 and plastic cover 224, 324 are located at a distance within the packaging profile line 34 so there are no packaging violations as shown in FIG. 1.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A low profile electric pump arrangement comprising:
    a motor housing;
    an inverter housing having a first side connected to the motor housing and a second side of the inverter housing having a recess defined by an edge wall;
    an electronics control unit (ECU) within the recess on the second side of the inverter housing;
    a plastic cover having a perimeter sized to cover the recess and seal against the edge wall of the recess, and
    a metal bracket over molded into the plastic cover, the metal bracket has at least one exposed surface that engages the inverter housing to hold the plastic cover onto the inverter housing in a position so that the plastic cover covers and seals the ECU and recess at the second side of the inverter housing.

2. The low profile electric pump arrangement of claim 1 further comprising:
    an over molded portion of the metal bracket that is encapsulated within the plastic cover, and the at least one exposed surface of the metal bracket is an arm that extends away from the plastic cover and the over molded portion of the metal bracket, past the perimeter of the plastic cover, and
    wherein the arm has a fastener tab with an aperture sized to receive a fastener for connecting the metal bracket and plastic cover to the motor housing and to hold the plastic cover against the inverter housing at a position so that the plastic cover covers and seals the ECU and recess of the second side of the inverter housing.

3. The low profile electric pump arrangement of claim 2 wherein the metal bracket is made of steel.

4. The low profile electric pump arrangement of claim 2 wherein the plastic cover has an inside surface and an outside surface, the outside surface has a first plane and the arm has a shoulder that extends past the inside surface, bends away from the plastic cover and forms a fastener tab, wherein the aperture of the arm is located at the fastener tab and the fastener tab has a second plane that is parallel to the first plane of the outside surface of the plastic cover.

5. The low profile electric pump arrangement of claim 2 wherein the arm has a shoulder that extends away from the plastic cover and terminates at a fastener tab, wherein the aperture of the arm is located through the fastener tab.

6. The low profile electric pump arrangement of claim 5 wherein the shoulder and fastener tab have a thickness of about 1.5 mm or less.

7. The low profile electric pump arrangement of claim 2 wherein the arm has a thickness of about 1.5 mm or less.

8. The low profile pump arrangement of claim 2 further comprising;
    wherein the fastener has a head with a threaded shaft extending from the head, wherein the threaded shaft has a diameter;
    a threaded fastener aperture formed in the motor housing, wherein the threaded fastener aperture is threaded and mates with the threaded shaft of the fastener forming a threaded connection;
    a clearance aperture in the inverter housing larger than the diameter of the threaded shaft of the fastener, where the threaded shaft passes through the clearance aperture of the inverter housing, and
    wherein the aperture of the fastener tab of the arm is a clearance aperture that is larger in diameter than the threaded shaft of the fastener so that the threaded shaft passes through the aperture of the fastener tab, and the head of the fastener contacts a portion of the fastener tab around the circumference of the aperture so that the head presses against the fastener tab, thereby holding the plastic cover and inverter housing against the motor housing using the threaded connection.

9. A low profile electric pump arrangement of claim 1 wherein the metal bracket has a shape that conforms to the perimeter of the plastic cover and has an exposed surface that extends past the perimeter of the plastic cover and is larger than the edge wall of the recess, wherein the metal bracket is malleable so that upon connection of the plastic cover to the inverter housing, the exposed surface is shaped and forms a press-fit connection between the plastic cover and the edge wall of the recess of the inverter housing.

10. The low profile electric pump arrangement of claim 9 wherein the metal bracket is made of aluminum.

11. The low profile electric pump of claim 9 wherein the exposed surface has one or more grooves so that upon connection of the plastic cover to the inverter housing, the one or more grooves deform and provide the press-fit connection between the plastic cover and the edge wall of the recess of the inverter housing.

12. The low profile electric pump of claim 9 wherein the metal bracket has a plurality of teeth and a plurality of recesses spaced between each of the plurality of teeth, around the outer circumference of the metal bracket, wherein a plastic material used to form the plastic covered is formed in the plurality of recesses to secure the metal bracket to the plastic cover.

13. The low profile electric pump of claim 9 further comprising
a circumferential groove located under the metal bracket, and
a rubber gasket within the groove, wherein the rubber gasket deforms and presses against the edge wall of the recess to provide a seal between the plastic cover and the inverter housing.

14. A low profile electric pump arrangement comprising:
a transmission casing having a pump portion for pumping fluid within the transmission casing;
a motor housing connected to the pump portion;
an inverter housing having a first side connected to the motor housing and a second side of the inverter housing having a recess defined by an edge wall;
an electronics control unit (ECU) within the recess on the second side of the inverter housing;
a plastic cover having a perimeter sized to cover the recess and seal against the edge wall of the recess;
a metal bracket over molded into the plastic cover, the metal bracket has at least one exposed surface that engages the inverter housing to hold the plastic cover onto the inverter housing in a position so that the plastic cover seals and covers the ECU and recess at the second side of the inverter housing, and
a packaging profile line defined by clearance points located on the transmission casing, wherein the motor housing, inverter housing and plastic cover are located at a distance within the packaging profile line.

15. The low profile electric pump arrangement of claim 14 further comprising:
an over molded portion of the metal bracket that is encapsulated within the plastic cover, and the at least one exposed surface of the metal bracket is an arm that extends away from the plastic cover and the over molded portion of the metal bracket, past the perimeter of the plastic cover, and
wherein the arm has a fastener tab with an aperture sized to receive a fastener for connecting the metal bracket and plastic cover to the motor housing and to hold the plastic cover against the inverter housing at a position so that the plastic cover seals and covers the ECU and recess of the second side of the inverter housing.

16. The low profile electric pump arrangement of claim 15 wherein the metal bracket is made of steel.

17. The low profile electric pump arrangement of claim 15 wherein the plastic cover has an inside surface and an outside surface, the outside surface has a first plane and the arm has a shoulder that extends past the inside surface, bends away from the plastic cover and forms a fastener tab, wherein the aperture of the arm is located at the fastener tab and the fastener tab has a second plane that is parallel to the first plane of the outside surface of the plastic cover.

18. The low profile electric pump arrangement of claim 15 wherein the arm has a shoulder that extends away from the plastic cover and terminates at a fastener tab, wherein the aperture of the arm is located through the fastener tab.

19. The low profile electric pump arrangement of claim 18 wherein the shoulder and fastener tab have a thickness of about 1.5 mm or less.

20. The low profile electric pump arrangement of claim 15 wherein the arm has a thickness of about 1.5 mm or less.

21. The low profile pump arrangement of claim 15 further comprising;
wherein the fastener has a head with a threaded shaft extending from the head, wherein the threaded shaft has a diameter;
a threaded fastener aperture formed in the motor housing, wherein the threaded fastener aperture is threaded and mates with the threaded shaft of the fastener forming a threaded connection;
a clearance aperture in the inverter housing larger than the diameter of the threaded shaft of the fastener, where the threaded shaft passes through the clearance aperture of the inverter housing, and
wherein the aperture of the fastener tab of the arm is a clearance aperture that is larger in diameter than the threaded shaft of the fastener so that the threaded shaft passes through the aperture of the fastener tab, and the head of the fastener contacts a portion of the fastener tab around the circumference of the aperture so that the head presses against the fastener tab, thereby holding the plastic cover and inverter housing against the motor housing using the threaded connection.

22. A low profile electric pump arrangement of claim 14 wherein the metal bracket has a shape that conforms to the perimeter of the plastic cover and has an exposed surface that extends past the perimeter of the plastic cover and is larger than the edge wall of the recess, wherein the metal bracket is malleable so that upon connection of the plastic cover to the inverter housing, the exposed surface is shaped and forms a press-fit connection between the plastic cover and the edge wall of the recess of the inverter housing.

23. The low profile electric pump arrangement of claim 22 wherein the metal bracket is made of aluminum.

24. The low profile electric pump of claim 22 wherein the exposed surface has one or more grooves so that upon connection of the plastic cover to the inverter housing, the one or more grooves deform and provide the press-fit connection between the plastic cover and the edge wall of the recess of the inverter housing.

25. The low profile electric pump of claim 22 further comprising
a circumferential groove located under the metal bracket, and a rubber gasket within the groove, wherein the rubber gasket deforms and presses against the edge wall of the recess to provide a seal between the plastic cover and the inverter housing.

26. The low profile electric pump of claim 22 wherein the metal bracket has a plurality of teeth and a plurality of recesses spaced between each of the plurality of teeth, around the outer circumference of the metal bracket, wherein a plastic material used to form the plastic covered is formed in the plurality of recesses to secure the metal bracket to the plastic cover.

* * * * *